(12) United States Patent
Nakamura (10) Patent No.: US 9,954,439 B1
(45) Date of Patent: Apr. 24, 2018

(54) CONTROL CIRCUIT OF SWITCHING POWER-SUPPLY DEVICE AND SWITCHING POWER-SUPPLY DEVICE

(71) Applicant: SANKEN ELECTRIC CO., LTD., Niiza-shi, Saitama (JP)

(72) Inventor: Masaru Nakamura, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 15/331,867

(22) Filed: Oct. 23, 2016

(51) Int. Cl.
*G05F 1/40* (2006.01)
*H02M 3/157* (2006.01)
*H02M 3/158* (2006.01)
*H02M 1/00* (2006.01)

(52) U.S. Cl.
CPC .......... *H02M 3/157* (2013.01); *H02M 1/00* (2013.01); *H02M 3/158* (2013.01); *H02M 2001/0025* (2013.01)

(58) Field of Classification Search
CPC .......... H02M 3/33515; H02M 3/1588; H02M 2001/0012; Y02B 70/1475
USPC ............... 323/222, 224, 235, 265, 266, 273, 323/282–288, 351; 363/16, 17, 127
See application file for complete search history.

(56) References Cited

U.S. PATENT DOCUMENTS

| | | | | |
|---|---|---|---|---|
| 4,857,822 A * | 8/1989 | Tabisz | ................... | H02M 3/155 323/235 |
| 7,924,577 B2 * | 4/2011 | Jansen | .............. | H02M 3/33507 363/21.02 |
| 8,081,019 B2 * | 12/2011 | Jungreis | .................. | H02M 1/12 327/122 |
| 9,077,246 B2 * | 7/2015 | Jeong | ..................... | H02M 3/285 |
| 9,083,254 B1 * | 7/2015 | Clarkin | ............... | H02M 3/3353 |
| 2003/0174005 A1 * | 9/2003 | Latham, II | ............ | H02M 3/157 327/172 |
| 2012/0062201 A1 * | 3/2012 | Hachiya | .............. | H02M 3/1588 323/283 |

FOREIGN PATENT DOCUMENTS

JP 5055083 5/2009

* cited by examiner

*Primary Examiner* — Rajnikant Patel
(74) *Attorney, Agent, or Firm* — Banner & Witcoff, Ltd.

(57) ABSTRACT

A control circuit of a switching power-supply device that converts a first DC voltage supplied from an input power source to a second DC voltage, includes: a first A/D converter that converts the second DC voltage into a first digital value, in response to a sampling clock depending on a first sampling clock and a second sampling clock; a control signal generation unit that generates a control signal for controlling on-and-off of the switching element based on of a difference between the first digital value and a target value; a regeneration completion sensing unit that senses completion of regeneration of the inductor and outputs a regeneration completion signal; and a sampling clock generation unit that: generates the first sampling clock, in response to the control signal to turn on the switching element, and generates the second sampling clock, in response to the regeneration completion signal.

12 Claims, 5 Drawing Sheets

CONTROL CIRCUIT OF SWITCHING POWER-SUPPLY DEVICE AND SWITCHING POWER-SUPPLY DEVICE

TECHNICAL FIELD

This disclosure relates to a control circuit of a switching power-supply device and the switching power-supply device.

BACKGROUND

A known switching power-supply device performs output voltage control by a switching operation of a switching element connected to an inductor. In this switching power-supply device, in high-end use such as a server or a communication infrastructure, complicated functions are required for control of power supply state monitoring and the like, so that digital control becomes mainstream in order to perform the functions.

For example, the specification of JP-B-5055083 discloses a switching power-supply device that converts an output voltage into a digital value by an analog-to-digital converter (hereinafter, referred to as an A/D converter) and controls an on-width, which is a period for turning on a switching element, based on a difference between the digital value and a target value predetermined in advance.

SUMMARY

In the case of digital-controlling a switching element, it is general to sample an output voltage in an A/D converter only once during a one-time switching cycle, convert the sampled output voltage into a predetermined bit number of digital value, and control a switching operation based on the digital value.

However, in the configuration of sampling the output voltage only once during the one switching cycle, when an output load current has suddenly changed from a light load to a heavy load, a certain time is required depending on the timing of the sudden change until the output voltage is sampled.

Therefore, it is difficult to perform a change in switching control in accordance with a load change in a short time, and thus the output voltage largely drops. When this drop is too large and the voltage becomes less than an allowable voltage of a load circuit, an abnormal operation occurs.

In order to avoid such an abnormal operation, it is necessary to use an output capacitor having a large allowable value. However, it becomes an obstacle of miniaturization and cost-down of a device.

This disclosure is to provide a control circuit of a switching power-supply device capable of suppressing a reduction of an output voltage at the time of a sudden load change, by a small and inexpensive configuration, and the switching power-supply device including the same.

A control circuit of a switching power-supply device according to this disclosure turns on-and-off a switching element connected to an inductor, converts a first DC voltage supplied from an input power source to a second DC voltage, and outputs the second DC voltage. The control circuit includes a first A/D converter that converts the second DC voltage into a digital value, in response to a sampling clock depending on a first sampling clock and a second sampling clock; a control signal generation unit that generates a control signal for controlling on-and-off of the switching element based on of a difference between the digital value and a target value; a regeneration completion sensing unit that senses completion of regeneration of the inductor and outputs a regeneration completion signal; and a sampling clock generation unit that: generates the first sampling clock, in response to the control signal to turn on the switching element, and generates the second sampling clock, in response to the regeneration completion signal.

The switching power-supply device of this disclosure includes the control circuit and the switching element controlled by the control circuit.

According to the control circuit of the switching power-supply device and the switching power-supply device of the present disclosure, it is possible to suppress a reduction of an output voltage by a small and inexpensive configuration at the time of a sudden load change.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, embodiments of this disclosure will be described with reference to each of drawings.

Figure 1:
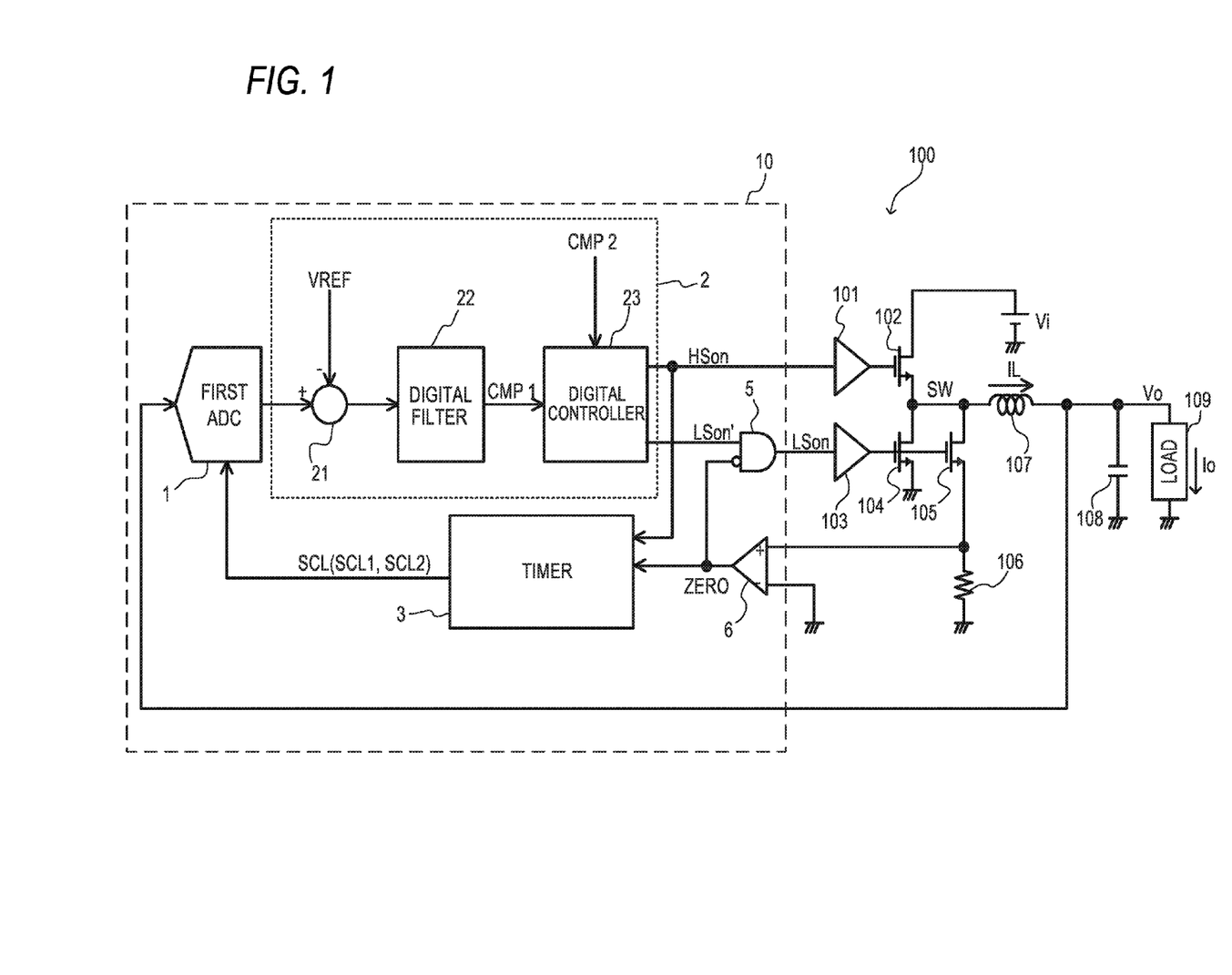
FIG. 1 is a schematic diagram illustrating a schematic configuration of a switching power-supply device 100 which is an embodiment of this disclosure.

FIG. 1 is a schematic diagram illustrating a schematic configuration of a switching power-supply device 100 which is an embodiment of this disclosure.

The switching power-supply device 100 illustrated in FIG. 1 includes a control circuit 10, a high-side drive circuit 101, a high-side MOSFET 102 serving as a switching element, a low-side drive circuit 103, a low-side MOSFET 104 serving as a switching element, a protection MOSFET 105, a resistor 106, an inductor 107, and an output capacitor 108.

A drain of the high-side MOSFET 102 is connected to an input power source that supplies a first DC voltage Vi. A source of the high-side MOSFET 102 is connected to a drain of the low-side MOSFET 104. A source of the low-side MOSFET 104 is connected to a ground terminal.

The high-side MOSFET 102 is turned on-and-off according to that gate voltage is controlled by the high-side drive circuit 101.

The high-side drive circuit 101 turns on the high-side MOSFET 102 in a period where a control signal HSon supplied from the control circuit 10 is High, and turns off the high-side MOSFET 102 in a period where the control signal HSon is Low.

The low-side MOSFET 104 is turned on-and-off according to that gate voltage is controlled by the low-side drive circuit 103.

The low-side drive circuit 103 turns on the low-side MOSFET 104 in a period where a control signal LSon supplied from the control circuit 10 is High, and turns off the low-side MOSFET 104 in a period where the control signal LSon is Low.

The inductor 107 has one end connected to a connection point SW between the high-side MOSFET 102 and the low-side MOSFET 104 and the other end connected to a load circuit 109. A current flowing through the inductor 107 is called an inductor current IL. The load circuit 109, for example, is a digital signal processing LSI.

The output capacitor 108 is connected between a connection point between the inductor 107 and the load circuit 109 and the ground terminal.

A drain of the protection MOSFET 105 is connected to a connection point between the connection point SW and the inductor 107. A source of the protection MOSFET 105 is connected to one end of the resistor 106. The other end of the resistor 106 is connected to the ground terminal.

The switching power-supply device 100 illustrated in FIG. 1 alternately switches the high-side MOSFET 102 and the low-side MOSFET 104 by the control signal supplied from the control circuit 10, thereby converting the first DC voltage Vi supplied from the input power source to a second DC voltage Vo and supplying the load circuit 109 with the second DC voltage Vo.

The control circuit 10 includes a first A/D converter (hereinafter, referred to as ADC) 1, a control signal generation unit 2, a timer 3, an AND circuit 5, and a comparator 6. Each component of the control circuit 10 indicates a functional block formed when a processor executes a program.

The first ADC 1 samples the second DC voltage Vo at a timing when a sampling clock SCL supplied from the timer 3 is received, and converts the sampled second DC voltage Vo into a digital value.

The control signal generation unit 2 generates control signals HSon and Lson' for performing on-and-off control of the high-side MOSFET 102 and the low-side MOSFET 104, based on a difference between the digital value, which has been obtained by converting the second DC voltage Vo in the first ADC 1, and a target value VREF decided in advance.

Specifically, the control signal generation unit 2 includes a subtraction section 21, a digital filter 22, and a digital controller 23.

The subtraction section 21 calculates a difference between the digital value converted by the first ADC 1 and the aforementioned target value VREF.

The digital filter 22 performs a PID (Proportion, Integration, and Differentiation) operation with respect to the difference obtained by the subtraction section 21. This operation result is called a first comparison value CMP1. The first comparison value CMP1 is controlled to be low as an output load current Io flowing through the load circuit 109 becomes large.

The digital controller 23 compares a count value CNT with a second comparison value CMP2 decided in advance and the aforementioned first comparison value CMP1, thereby outputting the control signals HSon and Lson' having a predetermined frequency. The second comparison value CMP2 is a fixed value and is a smaller than the first comparison value CMP1.

Specifically, the digital controller 23 outputs a control signal HSon at a low level when the count value CNT reaches the second comparison value CMP2, and outputs a control signal Lson' at a low level when the count value CNT reaches the first comparison value CMP1, thereby repeating an operation for returning the count value CNT to an initial value CMP0.

Furthermore, the digital controller 23 outputs a control signal Lson' at a high level after the control signal HSon at the low level is output and then a predetermined dead time passes, and outputs a control signal HSon at a high level after the control signal Lson' at the low level is output and then the predetermined dead time passes.

Since the second comparison value CMP2 is a fixed value, a period (an on-width), where the control signal HSon becomes a high level, is fixed. Furthermore, since the first comparison value CMP1 is controlled to be high as the output load current Io flowing through the load circuit 109 becomes small, switching frequencies (frequencies of the control signals HSon and Lson') are controlled to a low value as a load becomes the light load.

The comparator 6 serves as a regeneration completion sensing unit that senses the completion of regeneration of the inductor 107. The comparator 6 compares a voltage of the connection point SW with a voltage (0 V) of the ground terminal, and outputs a regeneration completion signal ZERO when the two voltages coincide with each other.

In a light load in which the output load current Io is reduced, when regeneration of the inductor current IL is completed and the inductor current IL starts to flow in a reverse direction during the ON period of the low-side MOSFET 104, the voltage of the connection point SW is transitioned from a negative potential to a positive potential. Therefore, the comparator 6 can sense that the voltage level of the connection point SW about a zero voltage, thereby sensing a state in which the regeneration of the inductor 107 has been completed.

The protection MOSFET 105 is provided in order to prevent an overvoltage from being applied to the comparator 6 when the high-side MOSFET 102 is turned on. The resistor 106 serves as a leak path resistor.

The AND circuit 5 inputs a control signal LSon at a low level to the low-side drive circuit 103 when the regeneration completion signal ZERO is being output, and inputs the control signal Lson', which is output from the digital controller 23, to the low-side drive circuit 103 as the control signal LSon when the regeneration completion signal ZERO is being output.

The timer 3 receives the control signal HSon, which is output from the digital controller 23, to generate a first sampling clock SCL1, receives the regeneration completion signal ZERO from the comparator 6 to generate a second sampling clock SCL2, and supplies these generated sampling clocks to the first ADC 1 as a sampling clock SCL. The timer 3 serves as a sampling clock generation unit.

The timer 3 resets a count value TCNT to an initial value TCMP0 and starts up-counting from the initial value TCMP0 at the time point when the control signal HSon at the high level is received from the digital controller 23, and outputs the first sampling clock SCL1 when the count value TCNT reaches a predetermined value TCMP1.

The first sampling clock SCL1 is adjusted to be output in almost the middle of a period where the control signal HSon becomes a high level.

Furthermore, in the period where the regeneration completion signal ZERO is being received from the comparator 6, the timer 3 resets the count value TCNT to the initial value TCMP0 at the time point when the regeneration completion signal ZERO is received, and then performs the output of the second sampling clock SCL2 and the resetting of the count value TCNT to the initial value TCMP0 each time the count value TCNT reaches the aforementioned predetermined value TCMP1.

Next, an operation of the switching power-supply device 100 configured as above will be described.

Figure 2:
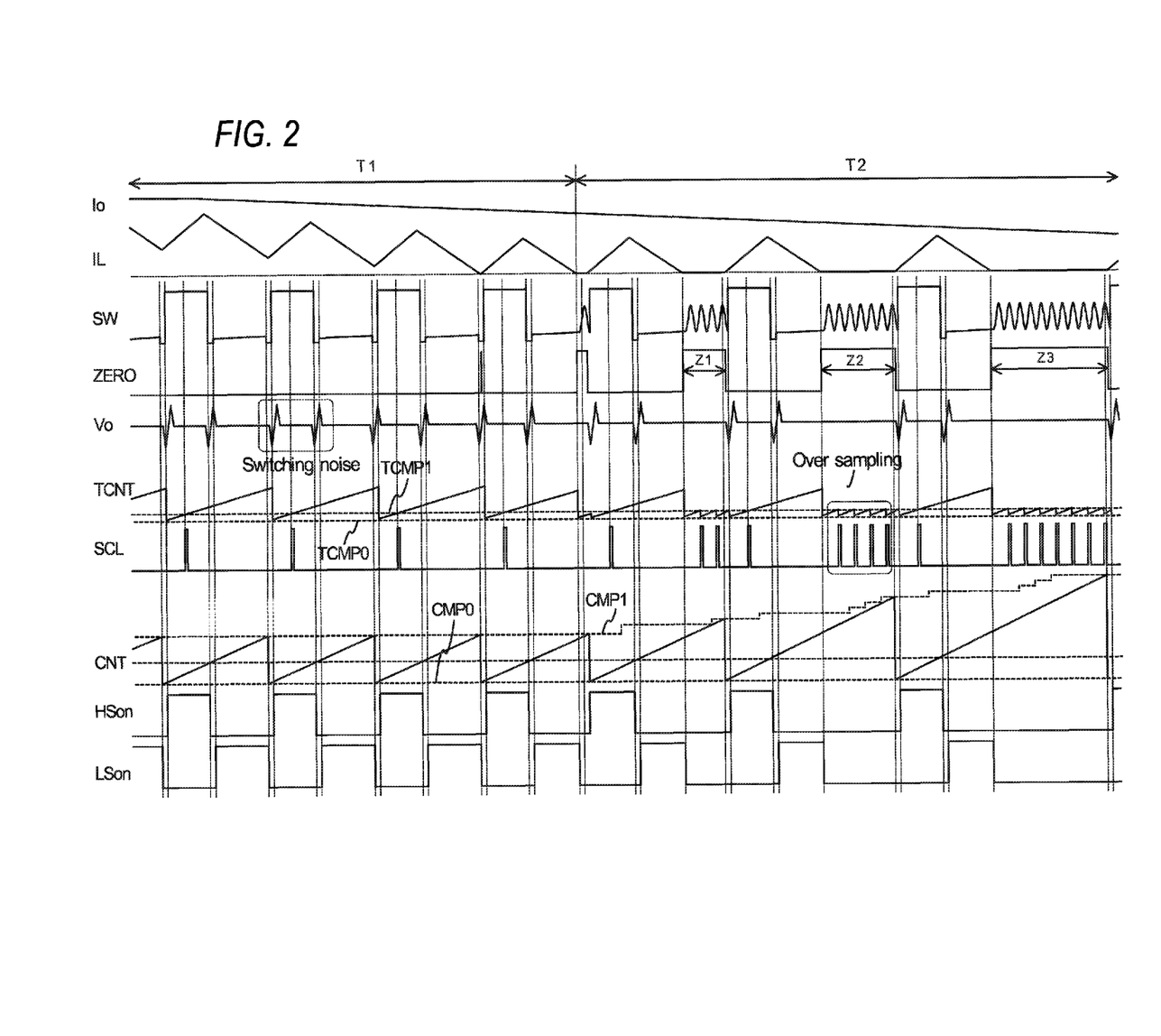
FIG. 2 is a timing chart for explaining an operation of the switching power-supply device 100 when a normal load is slowly changed to a light load.

FIG. 2 is a timing chart for explaining the operation of the switching power-supply device 100 when a normal load is slowly changed to a light load.

A period T1 illustrated in FIG. 2 indicates a period of a normal load state in which the regeneration of the inductor 107 is continuously performed without being completed. A period T2 illustrated in FIG. 2 indicates a period of a light load state in which the regeneration completion period of the inductor 107 intermittently occurs.

In the normal load state, since the regeneration completion signal ZERO is not output, the count value TCNT of the timer 3 reaches the predetermined value TCMP1 in the middle of the high level period of the control signal HSon, and at this timing, the second DC voltage Vo is sampled to be converted into a digital value. Based on a difference between the digital value and the target value VREF, the first comparison value CMP1 is controlled to be constant.

When the normal load state starts to be transitioned to the light load state, the regeneration completion signal ZERO is output. In FIG. 2, output periods of a regeneration completion signal ZERO initially output and a regeneration completion signal ZERO output second time are short.

Therefore, after the regeneration completion signal ZERO is output and the count value TCNT of the timer 3 is reset, the control signal HSon becomes a high level and the count value TCNT is reset before the count value TCNT reaches the predetermined value TCMP1.

Consequently, in the period where the initial regeneration completion signal ZERO has been output and the period where the second regeneration completion signal ZERO has been output, the second sampling clock SCL2 is not generated.

When the output load current Io is further reduced, the output period of the regeneration completion signal ZERO becomes long as indicated by output periods Z1 to Z3 of the drawing. In this way, during the output periods Z1 to Z3 of the regeneration completion signal ZERO, an operation is repeated to allow the count value TCNT of the timer 3 to reach the predetermined value TCMP1 from the initial value TCMP0, so that the second sampling clock SCL2 is generated at an interval shorter than that of the first sampling clock SCL1.

When the second DC voltage Vo is sampled by the second sampling clock SCL2, the sampled second DC voltage Vo is converted into a digital value. Based on a difference between the digital value and the target value VREF, the first comparison value CMP1 is controlled to be large in accordance with a load state.

The first comparison value CMP1 becomes large, resulting in an increase in a time (the cycle of the control signal Lson') until the count value CNT of the digital controller 23 is reset. Therefore, as a load becomes a light load, a switching frequency becomes low. In this way, switching loss is reduced, so that efficiency at the time of the light load is improved.

Figure 3:
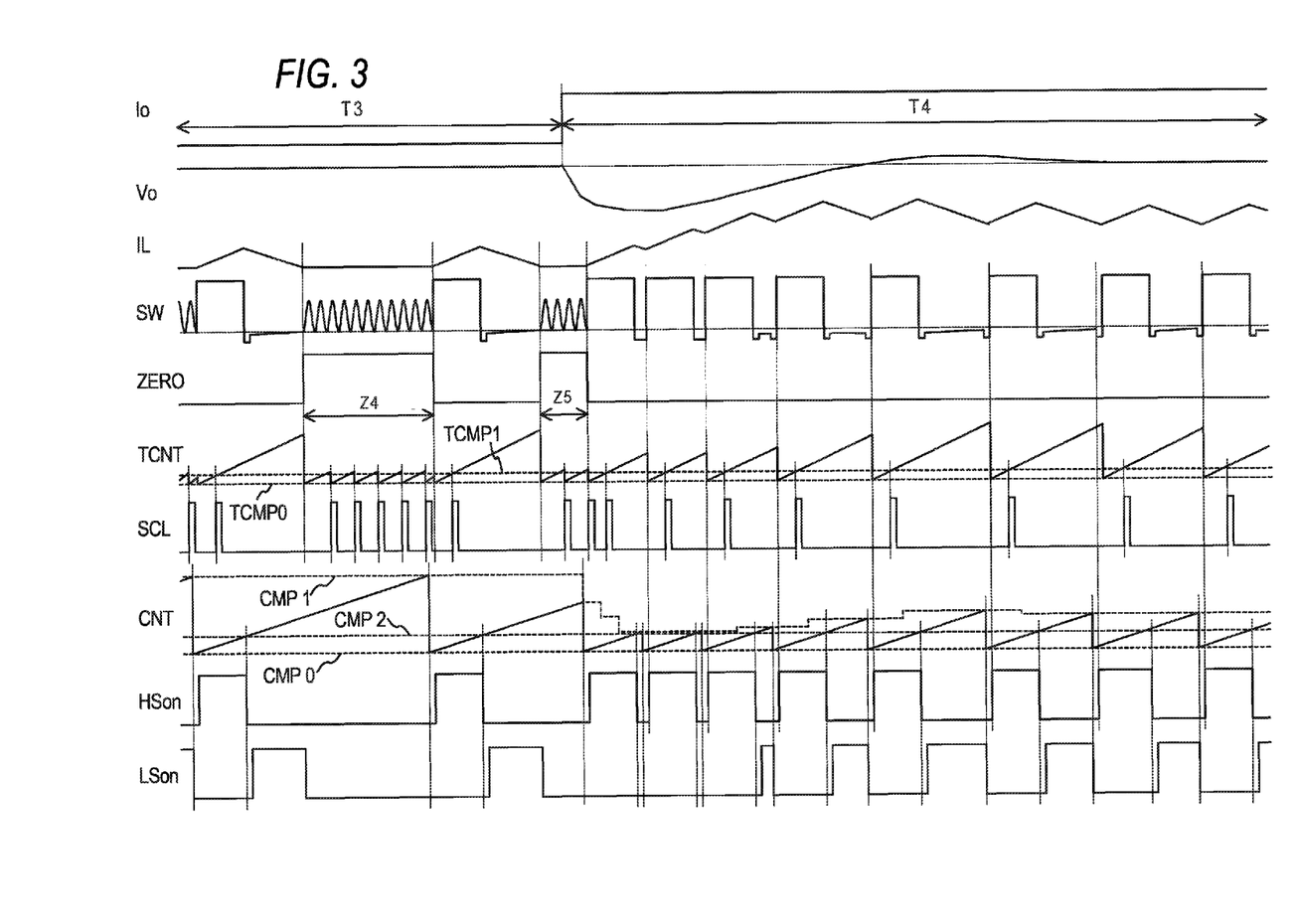
FIG. 3 is a timing chart for explaining an operation of the switching power-supply device 100 when a light load is suddenly changed to a normal load.

FIG. 3 is a timing chart for explaining the operation of the switching power-supply device 100 when the light load is suddenly changed to the normal load.

A period T3 illustrated in FIG. 3 indicates a period of a light load state in which the regeneration completion period of the inductor 107 intermittently occurs. A period T4 illustrated in FIG. 3 indicates a period of a normal load state in which the regeneration of the inductor 107 is continuously occurs without being completed.

As described above, in output periods Z4 and Z5 of the regeneration completion signal ZERO in the light load state, the second sampling clock SCL2 is regularly generated at short intervals. Therefore, the second DC voltage Vo has been sampled at short intervals.

As illustrated in FIG. 3, when the output load current Io suddenly increases in the middle of the output period Z5, the second DC voltage Vo is reduced. However, the second DC voltage Vo is directly sampled by the first ADC 1 by means of the second sampling clock SCL2 generated in the output period Z5.

Then, the sampled second DC voltage Vo is converted into a digital value, and the first comparison value CMP1 is controlled to be small in accordance with the load state based on a difference between the digital value and the target value VREF.

The first comparison value CMP1 is changed to a small value, so that the count value CNT of the digital controller 23 reaches the first comparison value CMP1 in a short time and is reset. Therefore, after the resetting, the control signal HSon becomes a high level, so that a switching operation is restarted.

In the example of FIG. 3, the output load current Io suddenly changes, the count value CNT of the digital controller 23 is reset, and then the first comparison value CMP1 is changed to a smaller value by the second sampling clock SCL2. Subsequently, the first comparison value CMP1 is changed to a smaller value (a value near the second comparison value CMP2) by the first sampling clock SCL1.

Consequently, immediately after the output load current Io suddenly changes, the count value CNT of the digital controller 23 reaches the first comparison value CMP1 and is reset directly after reaching the second comparison value CMP2. Therefore, immediately after the output load current Io suddenly changes, the frequency of the control signal HSon becomes high, so that the second DC voltage Vo quickly increases to the target value.

When the second DC voltage Vo increases to a certain degree, the first comparison value CMP1 is updated to a large value. In this way, an operation state at the time of the normal load state in the period T1 of FIG. 2 is reached.

As described above, according to the switching power-supply device 100, the second DC voltage Vo is sampled in the period where the regeneration completion signal ZERO is output, so that it is possible to sample the second DC voltage Vo high frequently while sampling the second DC voltage Vo during the period where the control signal HSon is at a high level.

Therefore, even though a load has suddenly changed, it is possible to sense a change in the second DC voltage Vo at an early stage and to update the first comparison value CMP1, so that it is possible to minimize a drop of the second DC voltage Vo. As a consequence, it is not necessary to use an output capacitor 108 having a large allowable value, so that it is possible to achieve miniaturization and cost-down of the device.

Furthermore, the switching power-supply device 100 has a configuration in which a switching frequency becomes low as a load is lightened. That is, in the light load state, since the output period of the regeneration completion signal ZERO is significantly longer than the non-output period of the regeneration completion signal ZERO, it is highly probable that a sudden change in a load will occur in this period.

Consequently, sampling of the second DC voltage Vo is performed in this period, so that it is possible to effectively prevent a drop of the second DC voltage Vo.

Furthermore, as illustrated in the waveform of the second DC voltage Vo of FIG. 2, in the period where the regeneration completion signal ZERO is output, noise caused by switching does not occur in the second DC voltage Vo.

According to the configuration in which the sampling of the second DC voltage Vo is performed in this period, since it is not necessary to accurately decide a generation timing of the second sampling clock SCL2, it is possible to simplify a design of the switching power-supply device. Furthermore, it is possible to accurately sample the second DC voltage Vo.

In the switching power-supply device 100, since the sampling of the second DC voltage Vo is performed in the period where the regeneration completion signal ZERO is output, so that it is possible to generate the second sampling clock SCL2 at an arbitrary timing regardless of control signals.

For example, as illustrated in FIGS. 2 and 3, the timer 3 can control the frequency of the second sampling clock SCL2 to be a value higher than that of the first sampling clock SCL1. Therefore, it is possible to sample the second DC voltage Vo high frequently.

According to the switching power-supply device 100, the on-width has been fixed (the second comparison value CMP2 has been fixed). Therefore, as illustrated in FIG. 3, immediately after a load suddenly changes, it is possible to quickly increase the second DC voltage Vo by a high frequency switching operation.

The first comparison value CMP1 is updated by the second sampling clock SCL2 in accordance with the increase in the second DC voltage Vo while quickly increasing the second DC voltage Vo, so that it is possible to achieve high speed load response performance.

The switching power-supply device 100 has a configuration in which the second comparison value CMP2 is fixed in order to decide the on-width which is a period where the control signal HSon becomes a high level; however, the second comparison value CMP2 may be variably controlled. Hereinafter, a description will be provided for a configuration in which the second comparison value CMP2 is variably controlled.

Figure 4:
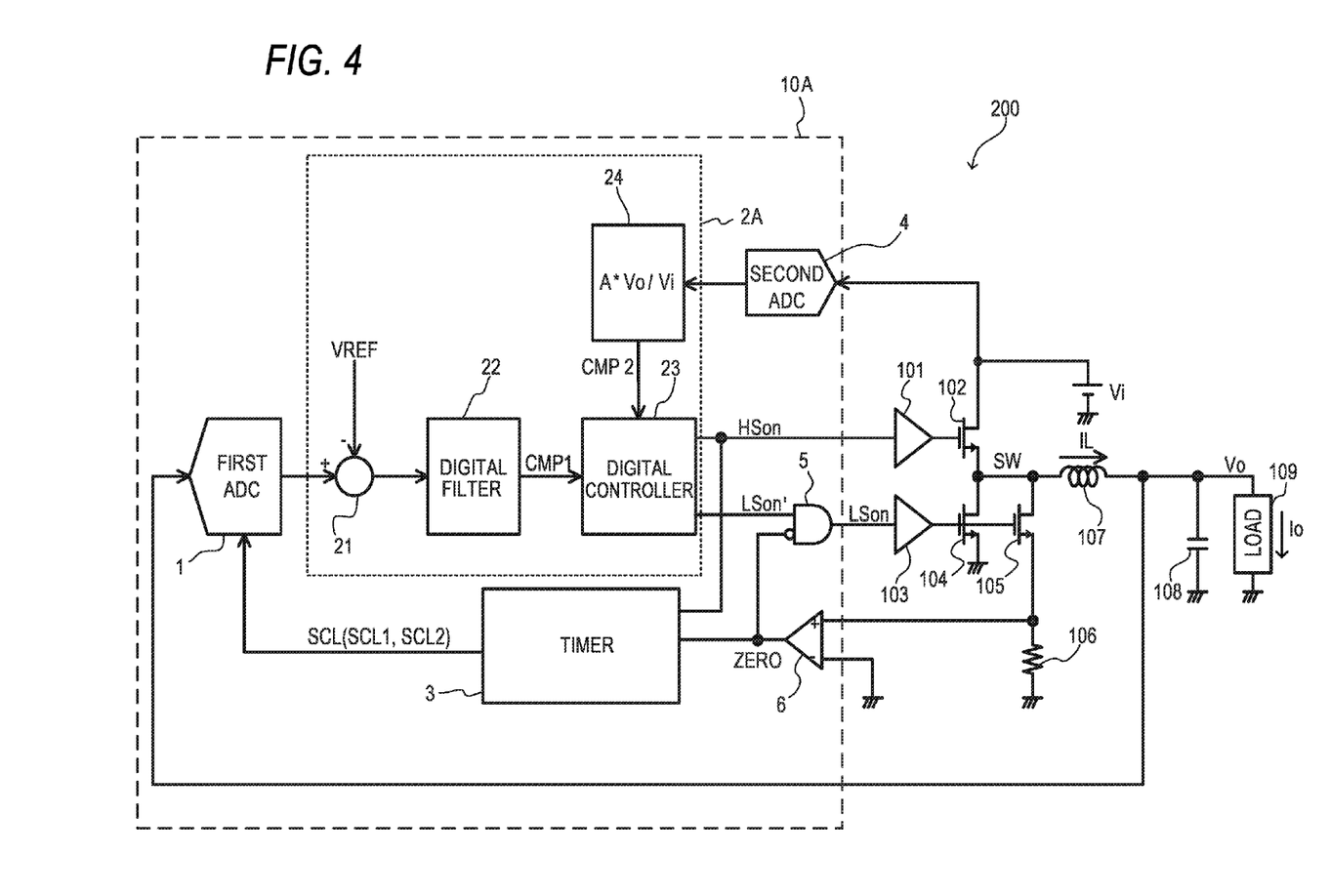
FIG. 4 is a schematic diagram illustrating a schematic configuration of a switching power-supply device 200 which is a modification example of the switching power-supply device 100 illustrated in FIG. 1.

FIG. 4 is a schematic diagram illustrating a schematic configuration of a switching power-supply device 200 which is a modification example of the switching power-supply device 100 illustrated in FIG. 1.

The switching power-supply device 200 has the same configuration as that of the switching power-supply device 100, except that the control circuit 10 has been changed to a control circuit 10A.

The control circuit 10A has the same configuration as that of the control circuit 10 of FIG. 1, except that the control signal generation unit 2 has been changed to a control signal generation unit 2A and a second ADC 4 has been added.

The control signal generation unit 2A has a configuration obtained by adding a second comparison value control section 24 (A*Vo/Vi) to the control signal generation unit 2.

The second ADC 4 converts the first DC voltage Vi into a predetermined bit number of digital value.

The second comparison value control section 24 controls the second comparison value CMP2, which is used by the digital controller 23, based on a first digital value of the second DC voltage Vo converted by the first ADC 1 and a second digital value of the first DC voltage Vi converted by the second ADC 4.

When the ON period of the high-side MOSFET 102 decided by the second comparison value CMP2 is defined as Ton, a switching frequency Fsw (the frequency of the control signal HSon) is decided by a ratio of the first DC voltage Vi and the second DC voltage Vo as expressed by Equation 1 below.

$$Fsw \cong (1/Ton) \times (Vo/Vi) \quad (1)$$

The second comparison value control section 24 generates the second comparison value CMP2 which is proportional to the second DC voltage Vo and is inverse proportional to the first DC voltage Vi, and supplies the second comparison value CMP2 to the digital controller 23. The operation of the switching power-supply device 200 is the same as that of the switching power-supply device 100, except that the second comparison value CMP2 is variable.

As described above, according to the switching power-supply device 200, the ON period of the high-side MOSFET 102 is controlled by the second comparison value CMP2 which is proportional to the second DC voltage Vo and is inverse proportional to the first DC voltage Vi. Therefore, it is possible to prevent efficiency reduction due to a high frequency switching operation at the time of low input and an output ripple increase due to a low frequency switching operation at the time of high input.

The second comparison value control section 24 may generate a second comparison value CMP2 which is proportional to the second DC voltage Vo, and supply the second comparison value CMP2 to the digital controller 23. Also in this configuration, it is effective if there is no change in the first DC voltage Vi.

Furthermore, the second comparison value control section 24 may generate a second comparison value CMP2 which is inverse proportional to the first DC voltage Vi, and supply the second comparison value CMP2 to the digital controller 23. Since the second DC voltage Vo is basically controlled to be constant, it is possible to obtain the aforementioned effects also in this configuration.

Additionally, the first ADC 1 may be configured to sequentially convert the second DC voltage Vo and the first DC voltage Vi into a first digital value and a second digital value. According to this configuration, it is possible to obtain the aforementioned effects also in this configuration.

Figure 5:
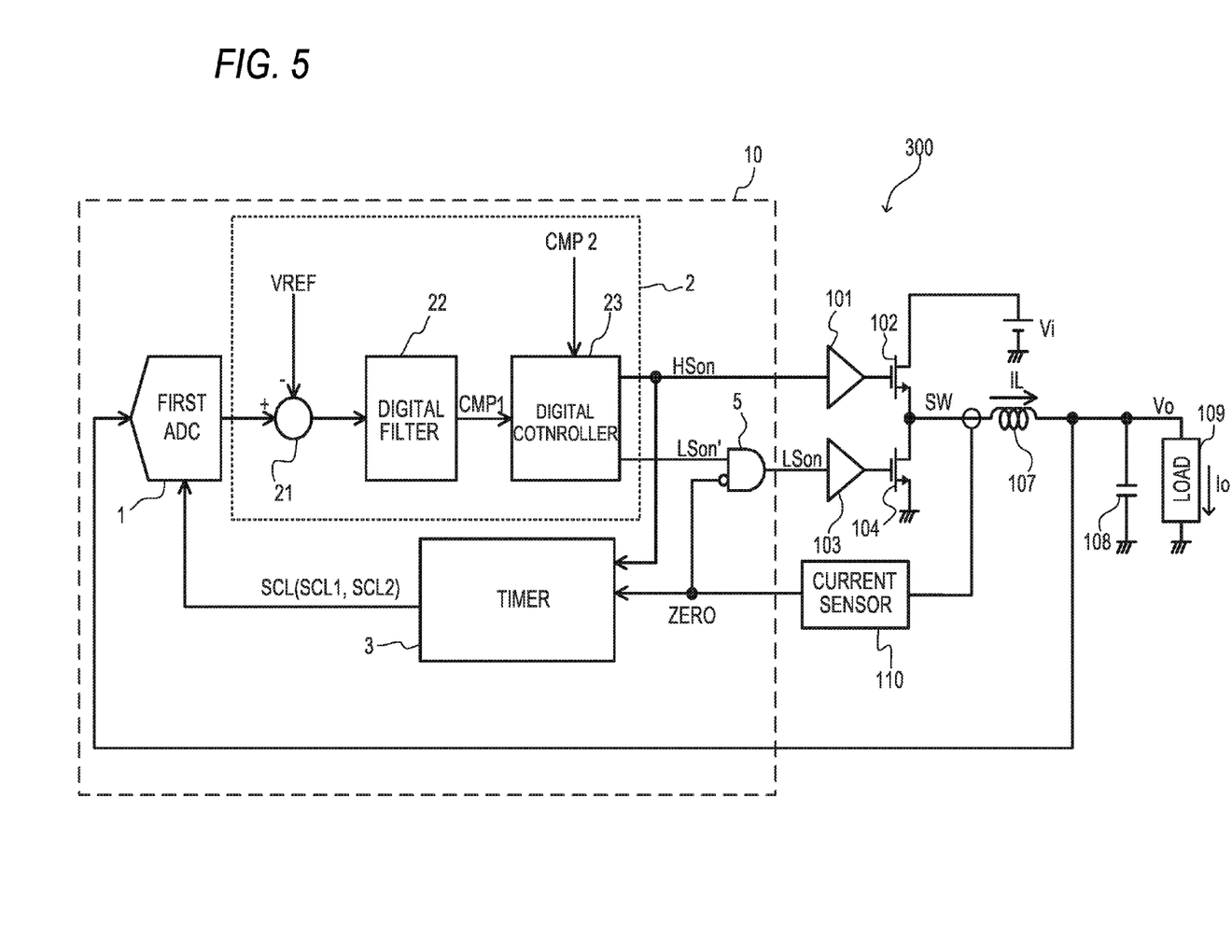
FIG. 5 is a schematic diagram illustrating a schematic configuration of a switching power-supply device 300 which is a modification example of the switching power-supply device 100 illustrated in FIG. 1.

FIG. 5 is a schematic diagram illustrating a schematic configuration of a switching power-supply device 300 which is a modification example of the switching power-supply device 100 illustrated in FIG. 1.

The switching power-supply device 300 has the same configuration as that of the switching power-supply device 100, except that the comparator 6, the protection MOSFET 105, and the resistor 106 are not provided and a current sensor 110 has been added.

The current sensor 110 senses that the regeneration of the inductor 107 has been completed by the size of the inductor current IL flowing through the inductor 107. When the inductor current IL is almost zero, the current sense 110 outputs the aforementioned regeneration completion signal ZERO. The current sense 110 serves as a regeneration completion sensing unit.

The current sense 110 can employ a configuration of directly sensing the inductor current IL by using a shunt resistor, a configuration of indirectly sensing the inductor current IL by using a DCR (DC Resistor) of the inductor 107, or a configuration of sensing the inductor current IL by using a Hall element in a non-contact manner.

According to the switching power-supply device 300, it is possible to accurately sense a period where the regeneration of the inductor 107 has been completed.

Therefore, it is possible to prevent the low-side MOSFET 104 from being stopped while the regeneration of the inductor 107 is not being completed or prevent the low-side MOSFET 104 from being turned on although the regeneration of the inductor 107 has been already completed, thereby reducing loss and achieving high efficiency.

The aforementioned embodiments have the configuration of generating the first sampling clock SCL1 during the high level period of the control signal HSon; however, it may be possible to employ a configuration of generating the first sampling clock SCL1 during the high level period of the control signal LSon.

That is, the timer 3 may have a configuration of resetting the count value TCNT to the initial value TCMP0 and starting up-counting from the initial value TCMP0 at the time point when the control signal LSon at the high level is received from the digital controller 23, and outputting the first sampling clock SCL1 when the count value TCNT reaches the predetermined value TCMP1.

Also in this configuration, it is possible to obtain the previously described effects in a similar manner.

Furthermore, in the aforementioned embodiments, the configuration, in which the high-side MOSFET 102 and the low-side MOSFET 104 are provided as two switching elements, has been described; however, this disclosure can also be applied to a switching power-supply device having a configuration in which there is no low-side MOSFET 104.

That is, this disclosure can also be applied to a switching power-supply device that turns on-and-off one switching element connected to the input power source, converts a first DC voltage supplied from the input power source to a second DC voltage, and outputs the second DC voltage.

Furthermore, in the aforementioned embodiments, the voltage dropping chopper circuit has been described as an example; however, this disclosure can also be applied to a switching power-supply device in which a switching element is connected to the input power source via an inductor serving as a primary wiring of a transformer, is turned on-and-off, a first DC voltage supplied from the input power source is converted to a second DC voltage, and the second DC voltage is output.

Furthermore, in the aforementioned embodiments, both the digital controller 23 and the timer 3 increase the count value and perform up-counting; however, it may be possible to employ a configuration of decreasing the count value and performing down-counting.

So far, the present disclosure has been described using the specific embodiments; however, it goes without saying that the aforementioned embodiments are an example and can be modified and embodied without departing the scope of the present disclosure.

As described above, this specification discloses the following features.

A control circuit of a switching power-supply device that turns on-and-off a switching element connected to an inductor, converts a first DC voltage supplied from an input power source to a second DC voltage, and outputs the second DC voltage, includes: a first A/D converter that converts the second DC voltage into a first digital value, in response to a sampling clock depending on a first sampling clock and a second sampling clock; a control signal generation unit that generates a control signal for controlling on-and-off of the switching element based on of a difference between the first digital value and a target value; a regeneration completion sensing unit that senses completion of regeneration of the inductor and outputs a regeneration completion signal; and a sampling clock generation unit that: generates the first sampling clock, in response to the control signal to turn on the switching element, and generates the second sampling clock, in response to the regeneration completion signal.

In the above described control circuit, the control signal generation unit may control a frequency of the control signal based on the difference between the digital value and the target value.

In the above described control circuit, the sampling clock generation unit may control a frequency of the second sampling clock to a value higher than a frequency of the first sampling clock.

In the above described control circuit, the sampling clock generation unit: may reset a count value to an initial value and starts counting from the initial value at a time point when the control signal to turn on the switching element is received; may output the first sampling clock when the count value reaches a predetermined value; may reset the count value to the initial value at a time point when the regeneration completion signal is received in a period where the regeneration completion signal is being received; and performs output of the second sampling clock and resetting of the count value each time the count value reaches the predetermined value.

The above described control circuit may include: a second A/D converter that converts the first DC voltage into a second digital value, wherein the control signal generation unit controls an on-width of the control signal to turn on the switching element based on the second digital value converted by the second A/D converter.

In the above described control circuit, the control signal generation unit may control the on-width of the control signal to turn on the switching element based on the first digital value converted by the first A/D converter.

In the above described control circuit, the control signal generation unit may control the on-width to be inverse proportional to the first digital value converted by the second A/D converter and to be proportional to the second digital value converted by the first A/D converter.

In the above described control circuit, the control signal generation unit may control the on-width of the control signal to turn on the switching element based on the first digital value.

In the above described control circuit, the first A/D further converts the first DC voltage into the second digital value, and the control signal generation unit may control an on-width of the control signal to turn on the switching element based on the second digital value converted by the first A/D converter.

In the above described control circuit, the control signal generation unit may control the on-width of the control signal to turn on the switching element based on the first digital value converted by the first A/D converter.

In the above described control circuit, the control signal generation unit may control the on-width to be inverse proportional to the second digital value converted by the first A/D converter and to be proportional to the first digital value converted by the first A/D converter.

A switching power-supply device includes: the control circuit of the above described switching power-supply device; and the switching element controlled by the control circuit.

What is claimed is:

1. A control circuit of a switching power-supply device that turns on-and-off a switching element connected to an inductor, converts a first DC voltage supplied from an input power source to a second DC voltage, and outputs the second DC voltage, comprising:
- a first A/D converter that converts the second DC voltage into a first digital value, in response to a first sampling clock or a second sampling clock;
- a control signal generation circuit that generates a control signal for controlling on-and-off of the switching element based on a difference between the first digital value and a target value;
- a regeneration completion sensing circuit that senses completion of regeneration of the inductor and outputs a regeneration completion signal; and
- a sampling clock generation circuit that:
  - generates the first sampling clock, in response to the control signal to turn on the switching element, and
  - generates the second sampling clock, in response to the regeneration completion signal.

2. The control circuit of the switching power-supply device according to claim 1, wherein the control signal generation circuit controls a frequency of the control signal based on the difference between the first digital value and the target value.

3. The control circuit of the switching power-supply device according to claim 1, wherein the sampling clock generation circuit controls a frequency of the second sampling clock to a value higher than a frequency of the first sampling clock.

4. The control circuit of the switching power-supply device according to claim 3, wherein the sampling clock generation circuit:
- resets a count value to an initial value and starts counting from the initial value at a time point when the control signal to turn on the switching element is received;
- outputs the first sampling clock when the count value reaches a predetermined value;
- resets the count value to the initial value at a time point when the regeneration completion signal is received; and
- during a period in which the regeneration completion signal is being received, performs output of the second sampling clock and resetting of the count value when the count value reaches the predetermined value.

5. The control circuit of the switching power-supply device according to claim 2, further comprising:
- a second A/D converter that converts the first DC voltage into a second digital value,
- wherein the control signal generation circuit controls an on-width of the control signal to turn on the switching element based on the second digital value converted by the second A/D converter.

6. The control circuit of the switching power-supply device according to claim 5, wherein the control signal generation circuit controls the on-width of the control signal to turn on the switching element based on the first digital value converted by the first A/D converter.

7. The control circuit of the switching power-supply device according to claim 6, wherein the control signal generation circuit controls the on-width to be inversely proportional to the second digital value converted by the second A/D converter and to be proportional to the first digital value converted by the first A/D converter.

8. The control circuit of the switching power-supply device according to claim 2, wherein the control signal generation circuit controls an on-width of the control signal to turn on the switching element based on the first digital value.

9. The control circuit of the switching power-supply device according to claim 2,
- wherein the first A/D converter further converts the first DC voltage into a second digital value, and
- wherein the control signal generation circuit controls an on-width of the control signal to turn on the switching element based on the second digital value converted by the first A/D converter.

10. The control circuit of the switching power-supply device according to claim 9, wherein the control signal generation circuit controls the on-width of the control signal to turn on the switching element based on the first digital value converted by the first A/D converter.

11. The control circuit of the switching power-supply device according to claim 9, wherein the control signal generation circuit controls the on-width to be inversely proportional to the second digital value converted by the first A/D converter and to be proportional to the first digital value converted by the first A/D converter.

12. A switching power-supply device comprising:
- the control circuit of the switching power-supply device according to claim 1; and
- the switching element controlled by the control circuit.

* * * * *